US009253227B2

(12) United States Patent
Jackson et al.

(10) Patent No.: US 9,253,227 B2
(45) Date of Patent: Feb. 2, 2016

(54) GEOLOCATION RESCHEDULING SYSTEM AND METHOD

(71) Applicant: Google Inc., Mountain View, CA (US)

(72) Inventors: Dean K. Jackson, Pittsburgh, PA (US); Daniel V. Klein, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 217 days.

(21) Appl. No.: 13/888,246

(22) Filed: May 6, 2013

(65) Prior Publication Data

US 2014/0330904 A1 Nov. 6, 2014

(51) Int. Cl.
H04L 29/06 (2006.01)
H04L 29/08 (2006.01)
G06Q 10/10 (2012.01)

(52) U.S. Cl.
CPC ........ H04L 65/4038 (2013.01); G06Q 10/1093 (2013.01); H04L 67/18 (2013.01)

(58) Field of Classification Search
CPC ....... H04L 65/403; H04L 29/06; G06Q 10/10
USPC ........................................................ 709/204
See application file for complete search history.

(56) References Cited

U.S. PATENT DOCUMENTS

| | | | |
|---|---|---|---|
| 8,849,689 B1 * | 9/2014 | Jagannathan et al. ....... 705/7.19 |
| 2004/0064355 A1 | 4/2004 | Dorenbosch et al. |
| 2006/0227047 A1 | 10/2006 | Rosenberg |
| 2007/0118415 A1 * | 5/2007 | Chen et al. ......................... 705/8 |
| 2008/0133282 A1 * | 6/2008 | Landar et al. ...................... 705/5 |
| 2009/0068992 A1 * | 3/2009 | Takehara et al. ............. 455/412.1 |
| 2009/0106077 A1 * | 4/2009 | Bhogal et al. ...................... 705/9 |
| 2010/0004854 A1 * | 1/2010 | Shin et al. ...................... 701/201 |
| 2010/0069054 A1 * | 3/2010 | Labidi et al. .................. 455/418 |
| 2010/0076951 A1 | 3/2010 | Lyle et al. |
| 2010/0228473 A1 * | 9/2010 | Ranford ......................... 701/204 |
| 2011/0130958 A1 * | 6/2011 | Stahl et al. ..................... 701/201 |
| 2014/0229099 A1 * | 8/2014 | Garrett et al. ................. 701/465 |

FOREIGN PATENT DOCUMENTS

KR          10-1054287          8/2011

OTHER PUBLICATIONS

International Search Report for PCT Application No. PCT/US2014/037028, dated Sep. 1, 2014, 10 pages.

* cited by examiner

*Primary Examiner* — Nicholas Taylor
*Assistant Examiner* — Chong G Kim
(74) *Attorney, Agent, or Firm* — Patent Law Works LLP

(57) ABSTRACT

A method, computer program product, and computing system for determining an initial meeting location for a meeting previously-scheduled to be attended by a plurality of attendees at a defined meeting time. A current attendee location is determined for each of the plurality of attendees proximate the defined meeting time, thus defining a plurality of attendee locations. The initial meeting location and one or more of the plurality of attendee locations are compared to determine if the initial meeting location could be changed. If the initial meeting location could be changed, at least one alternative meeting location is suggested.

21 Claims, 3 Drawing Sheets

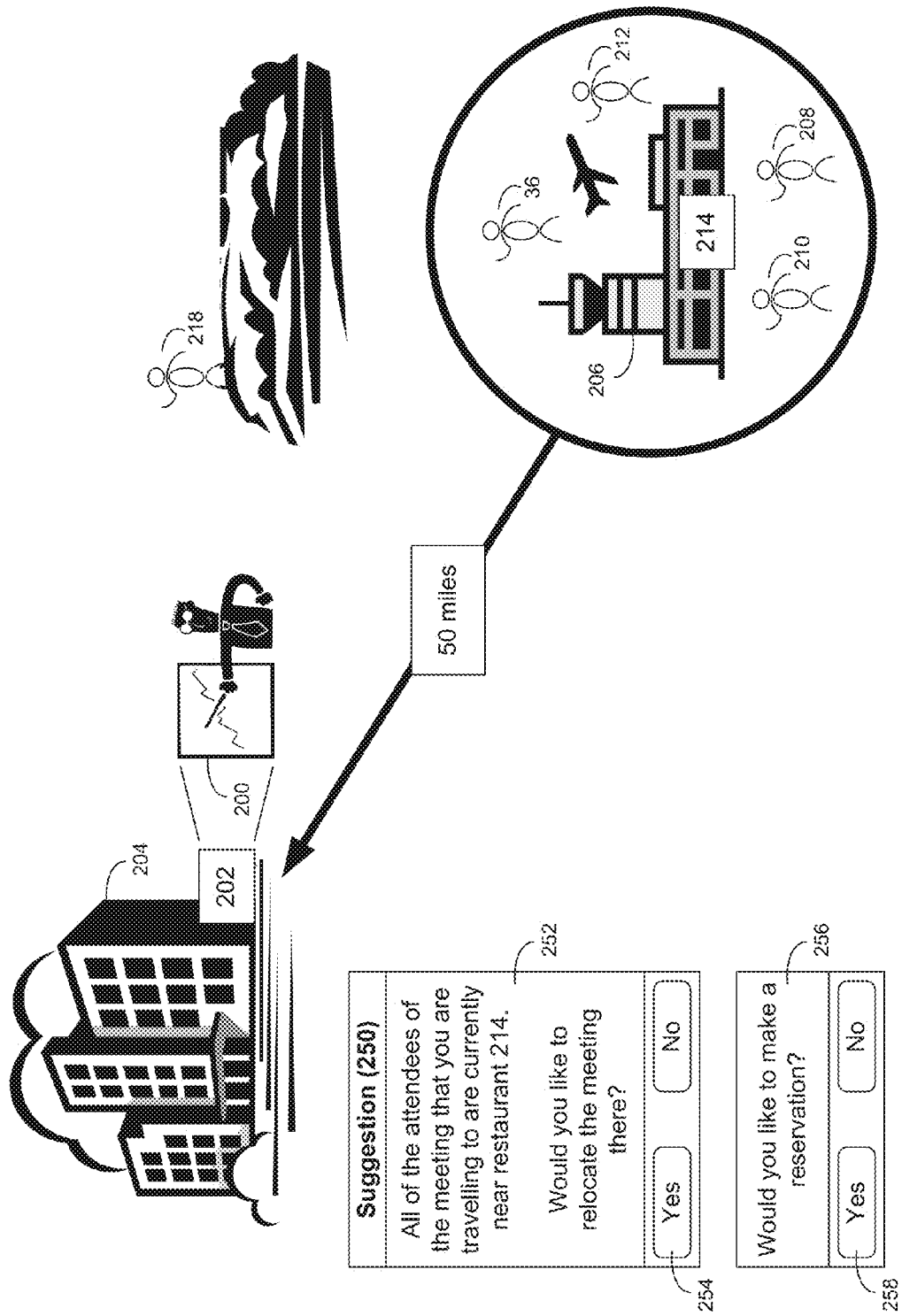

ns_US 9,253,227 B2_

GEOLOCATION RESCHEDULING SYSTEM AND METHOD

TECHNICAL FIELD

This disclosure relates to scheduling applications and, more particularly, to scheduling applications that consider the location of participants.

BACKGROUND

The Internet currently allows for the free exchange of ideas and information in a manner that was unimaginable only a couple of decades ago. One such use for the Internet is as a communication medium, whether it is via one-on-one exchanges or multi-party exchanges. For example, two individuals may exchange private emails with each other. Alternatively, multiple people may participate on a public website in which they may post entries that are published for multiple people to read. Examples of such websites may include but are not limited to product/service review sites and topical blogs.

Another use of the Internet is to allow groups of people to schedule meetings. Unfortunately, as meetings are scheduled for some time in the future, the location of the attendees of the meeting at the scheduled time of the meeting may be unknown. Accordingly, situations may occur in which attendees are required to travel to distant meetings when it might have been easier to reschedule the meeting to a closer location if it had been known that such a location was available and convenient.

SUMMARY OF DISCLOSURE

In one implementation, a computer-implemented method includes determining an initial meeting location for a meeting previously-scheduled to be attended by a plurality of attendees at a defined meeting time. A current attendee location is determined for each of the plurality of attendees proximate the defined meeting time, thus defining a plurality of attendee locations. The initial meeting location and one or more of the plurality of attendee locations are compared to determine if the initial meeting location could be changed. If the initial meeting location could be changed, at least one alternative meeting location is suggested.

One or more of the following features may be included. The at least one alternative meeting location may be proximate one or more of the plurality of attendee locations. Determining if the initial meeting location could be changed may include assigning an anticipated transportation mode to each of the plurality of attendees. A meeting reminder may be provided to each of the plurality of attendees proximate the defined meeting time based, at least in part, upon the anticipated transportation mode of each of the plurality of attendees.

Suggesting at least one alternative meeting location may include determining the availability of the at least one alternative meeting location. A reservation may be made at the at least one alternative meeting location. Comparing the initial meeting location and one or more of the plurality of attendee locations may include discounting one or more attendee locations associated with attendees that are not going to physically attend the meeting. Comparing the initial meeting location and one or more of the plurality of attendee locations may include determining if the at least one alternative meeting location is preferable to the one or more of the plurality of attendee locations than the initial meeting location based upon at least one of geographic proximity and transit time.

In another implementation, a computer program product resides on a computer readable medium and has a plurality of instructions stored on it. When executed by a processor, the instructions cause the processor to perform operations including determining an initial meeting location for a meeting previously-scheduled to be attended by a plurality of attendees at a defined meeting time. A current attendee location is determined for each of the plurality of attendees proximate the defined meeting time, thus defining a plurality of attendee locations. The initial meeting location and one or more of the plurality of attendee locations are compared to determine if the initial meeting location could be changed. If the initial meeting location could be changed, at least one alternative meeting location is suggested.

One or more of the following features may be included. The at least one alternative meeting location may be proximate one or more of the plurality of attendee locations. Determining if the initial meeting location could be changed may include assigning an anticipated transportation mode to each of the plurality of attendees. A meeting reminder may be provided to each of the plurality of attendees proximate the defined meeting time based, at least in part, upon the anticipated transportation mode of each of the plurality of attendees.

Suggesting at least one alternative meeting location may include determining the availability of the at least one alternative meeting location. A reservation may be made at the at least one alternative meeting location. Comparing the initial meeting location and one or more of the plurality of attendee locations may include discounting one or more attendee locations associated with attendees that are not going to physically attend the meeting. Comparing the initial meeting location and one or more of the plurality of attendee locations may include determining if the at least one alternative meeting location is preferable to the one or more of the plurality of attendee locations than the initial meeting location based upon at least one of geographic proximity and transit time.

In another implementation, a computing system including a processor and memory is configured to perform operations including determining an initial meeting location for a meeting previously-scheduled to be attended by a plurality of attendees at a defined meeting time. A current attendee location is determined for each of the plurality of attendees proximate the defined meeting time, thus defining a plurality of attendee locations. The initial meeting location and one or more of the plurality of attendee locations are compared to determine if the initial meeting location could be changed. If the initial meeting location could be changed, at least one alternative meeting location is suggested.

One or more of the following features may be included. The at least one alternative meeting location may be proximate one or more of the plurality of attendee locations. Determining if the initial meeting location could be changed may include assigning an anticipated transportation mode to each of the plurality of attendees. A meeting reminder may be provided to each of the plurality of attendees proximate the defined meeting time based, at least in part, upon the anticipated transportation mode of each of the plurality of attendees.

Suggesting at least one alternative meeting location may include determining the availability of the at least one alternative meeting location. A reservation may be made at the at least one alternative meeting location. Comparing the initial meeting location and one or more of the plurality of attendee locations may include discounting one or more attendee locations associated with attendees that are not going to physically attend the meeting. Comparing the initial meeting location and one or more of the plurality of attendee locations may include determining if the at least one alternative meeting location is preferable to the one or more of the plurality of attendee locations than the initial meeting location based upon at least one of geographic proximity and transit time.

The details of one or more implementations are set forth in the accompanying drawings and the description below. Other features and advantages will become apparent from the description, the drawings, and the claims.

BRIEF DESCRIPTION OF THE DRAWINGS

FIG. 3 is a diagrammatic view of a meeting location/attendee location map; and

FIG. 4 is a diagrammatic view of a suggestion window rendered by the geolocation rescheduling process of FIG. 1.

Like reference symbols in the various drawings indicate like elements.

DETAILED DESCRIPTION OF THE PREFERRED EMBODIMENTS

Introduction

Figure 1:
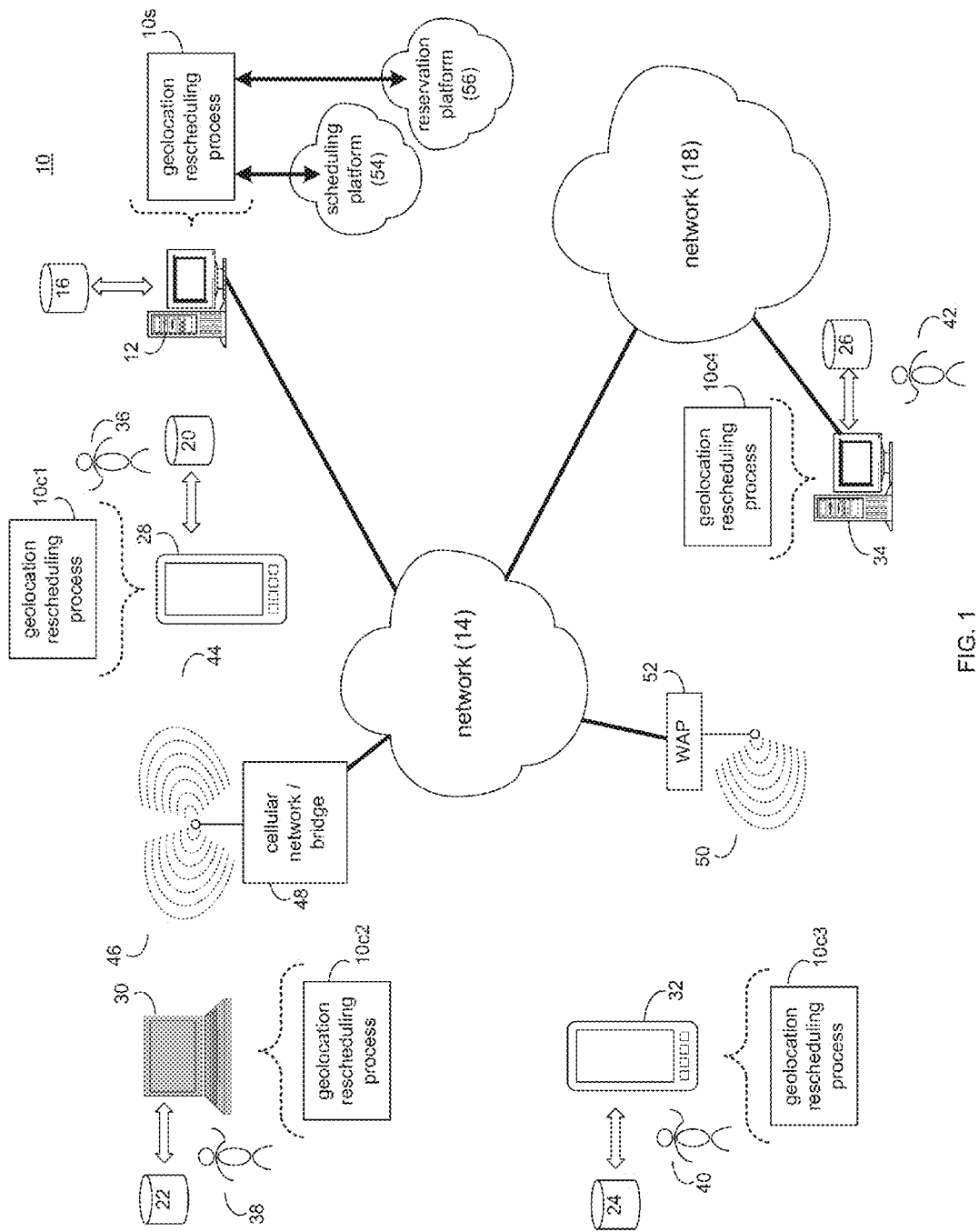
FIG. 1 is a diagrammatic view of a distributed computing network including a computing device that executes a geolocation rescheduling process according to an implementation of the present disclosure.
Figure 2:
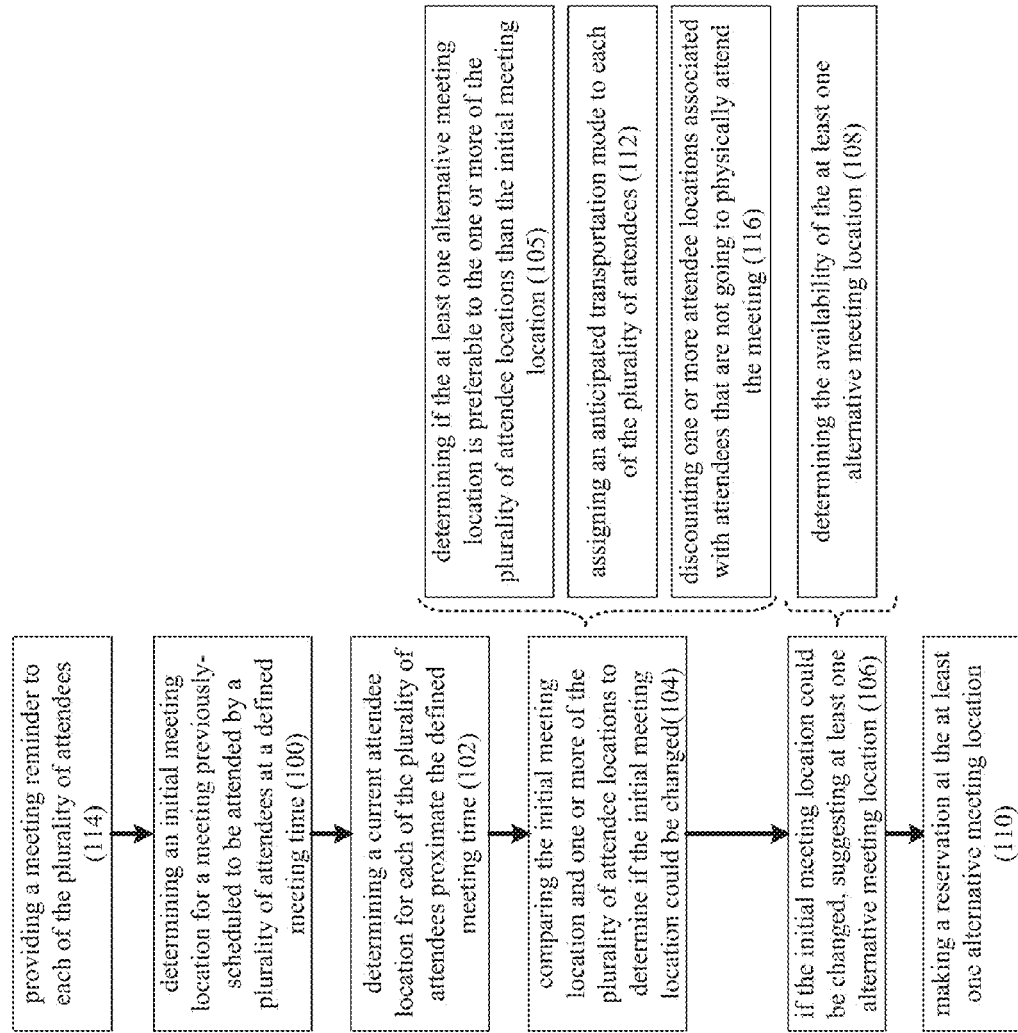
FIG. 2 is a flowchart of the geolocation rescheduling process of FIG. 1 according to an implementation of the present disclosure.

In FIGS. 1 & 2, there is shown geolocation rescheduling process 10. Geolocation rescheduling process 10 may be implemented as a server-side process, a client-side process, or a hybrid server-side/client-side process. For example, geolocation rescheduling process 10 may be implemented as a purely server-side process via geolocation rescheduling process 10s. Alternatively, geolocation rescheduling process 10 may be implemented as a purely client-side process via one or more of geolocation rescheduling process 10c1, geolocation rescheduling process 10c2, geolocation rescheduling process 10c3, and geolocation rescheduling process 10c4. Alternatively still, geolocation rescheduling process 10 may be implemented as a hybrid server-side/client-side process via geolocation rescheduling process 10s in combination with one or more of geolocation rescheduling process 10c1, geolocation rescheduling process 10c2, geolocation rescheduling process 10c3, and geolocation rescheduling process 10c4. Accordingly, geolocation rescheduling process 10 as used in this disclosure may include any combination of geolocation rescheduling process 10s, geolocation rescheduling process 10c1, geolocation rescheduling process 10c2, geolocation rescheduling process 10c3, and geolocation rescheduling process 10c4.

As will be discussed below in greater detail, geolocation rescheduling process 10 may determine 100 an initial meeting location for a meeting previously-scheduled to be attended by a plurality of attendees at a defined meeting time. A current attendee location may be determined 102 for each of the plurality of attendees proximate the defined meeting time, thus defining a plurality of attendee locations. The initial meeting location and one or more of the plurality of attendee locations may be compared 104 to determine if the initial meeting location could be changed. If the initial meeting location could be changed, at least one alternative meeting location may be suggested 106.

Geolocation rescheduling process 10s may be a server application and may reside on and may be executed by computing device 12, which may be connected to network 14 (e.g., the Internet or a local area network). Examples of computing device 12 may include, but are not limited to: a personal computer, a laptop computer, a personal digital assistant, a data-enabled cellular telephone, a notebook computer, a television with one or more processors embedded therein or coupled thereto, a server computer, a series of server computers, a mini computer, a mainframe computer, or a dedicated network device.

The instruction sets and subroutines of geolocation rescheduling process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of geolocation rescheduling processes 10c1, 10c2, 10c3, 10c4 may include but are not limited to a web browser, a web browser plug-in or applet, a game console user interface, a video conference user interface, or a specialized application (e.g., an application running on e.g., the Android™ platform or the iOS™ platform). The instruction sets and subroutines of geolocation rescheduling processes 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, data-enabled, cellular telephone 28, laptop computer 30, personal digital assistant 32, personal computer 34, a notebook computer (not shown), a server computer (not shown), a gaming console (not shown), a television (not shown), a tablet computer (not shown) and a dedicated network device (not shown). Client electronic devices 28, 30, 32, 34 may each execute an operating system, examples of which may include but are not limited to Microsoft Windows™, Android™, WebOS™, iOS™, Redhat Linux™, or a custom operating system.

The various client electronic devices (e.g., client electronic devices 28, 30, 32, 34) may be directly or indirectly coupled to network 14 (or network 18). For example, data-enabled, cellular telephone 28 and laptop computer 30 are shown wirelessly coupled to network 14 via wireless communication channels 44, 46 (respectively) established between data-enabled, cellular telephone 28, laptop computer 30 (respectively) and cellular network/bridge 48, which is shown directly coupled to network 14. Further, personal digital assistant 32 is shown wirelessly coupled to network 14 via wireless communication channel 50 established between personal digital assistant 32 and wireless access point (i.e., WAP)

52, which is shown directly coupled to network 14. Additionally, personal computer 34 is shown directly coupled to network 18 via a hardwired network connection.

WAP 52 may be, for example, an IEEE 802.11a, 802.11b, 802.11g, 802.11n, Wi-Fi, and/or Bluetooth device that is capable of establishing wireless communication channel 50 between personal digital assistant 32 and WAP 52. As is known in the art, IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Geolocation Rescheduling Process

Referring also to FIG. 3, assume for illustrative purposes that user 36 is traveling on business to attend meeting 200 in conference room 202 within building 204. Assume that building 204 is located approximately 50 miles away from airport 206 (i.e. the airport into which user 36 flew to attend meeting 200. Further assume that three other people (e.g. attendee 208, attendee 210, attendee 212) have also traveled to airport 206 to attend the meeting 200 in conference room 202 of building 204.

Assume that meeting 200 was scheduled using a scheduling platform (e.g. scheduling platform 54) that allows for the scheduling of meetings and the inviting of attendees to such meetings. Geolocation rescheduling process 10 may be a standalone application configured to work with scheduling platform 54, may be an applet/plug-in that is included within scheduling platform 54, or may be included within/a portion of scheduling platform 54. Examples of scheduling platform 54 may include the email and calendar portions of applications such as Microsoft Outlook™ and Google Mail & Calendar™. Accordingly, through the use of scheduling platform 54, meetings may be scheduled and assigned a date, time and location. Further, participants may be invited via email-based invitations (in the form of e-mail). Upon receiving such invitations, the recipients may accept or decline the invitation and (if accepted) their name may be added to the list of attendees. Through the use of such systems, meetings may be rescheduled, wherein a new time/date may be defined for previously scheduled meeting and updated invites may be sent to those people that confirmed their attendance.

Such systems may be configured to provide meeting participants with reminders concerning meeting 200. For example, since user 36 confirmed their participation in meeting 200, at some time prior to the scheduled time/date of meeting 200, user 36 may receive a notification, reminding them to attend meeting 200. Such notifications may be in the form of a pop-up window that appears on e.g. data-enabled, cellular telephone 28 (i.e. the client electronic device of user 36).

At some time prior to the scheduled time/date of meeting 200, geolocation rescheduling process 10 may determine 100 an initial meeting location (e.g., conference room 202 in building 204) for a meeting (e.g., meeting 200) previously-scheduled to be attended by a plurality of attendees (e.g., user 36, attendees 208, 210, 212) at a defined meeting time (e.g., 1 Jun. 2013). For example, geolocation rescheduling process 10 may determine 100 the location of meeting 200 to be conference room 202 in building 204 (or e.g., the GPS coordinates thereof).

Further, geolocation rescheduling process 10 may determine 102 a current attendee location for each of the plurality of attendees (e.g., user 36, attendees 208, 210, 212) proximate the defined meeting time (e.g., 1 Jun. 2013), thus defining a plurality of attendee locations (or e.g., the GPS coordinates thereof). For example, geolocation rescheduling process 10 may determine 102 the location(s) of user 36 and attendees 208, 210, 212. Depending upon the manner in which geolocation process 10 is configured, geolocation process 10 may repeatedly determine 102 the location(s) of e.g., user 36 and attendees 208, 210, 212 during a time window prior to meeting 200, as the location(s) of e.g., user 36 and attendees 208, 210, 212 may change as they travel to meeting 200. For example, starting two hours before meeting 200, geolocation rescheduling process 10 may repeatedly determine 102 the location(s) of user 36 and attendees 208, 210, 212 to determine if there is a more convenient location for user 36 and attendees 208, 210, 212 to meet (other than room 202 building 204).

When geolocation rescheduling process 10 determines 102 the current attendee location for each of the plurality of attendees (e.g., user 36, attendees 208, 210, 212), various operations may be performed. For example, geolocation rescheduling process 10 may determine 102 locations via GPS coordinates (as discussed above); cell tower multi-lateration; and WiFi access point association. Additionally, geolocation rescheduling process 10 may be configured to determine 102 the location of the attendees (e.g., user 36, attendees 208, 210, 212) via one or more of the attendees checking-in at a confirmed location (e.g., a person earlier in the day checked into a meeting having a known location).

Naturally and with respect to determination 102, if geolocation rescheduling process 10 performs this determination too early (e.g., a very long time before meeting 200), determination 102 may be less relevant due to the large chronological distance between the time of determination 102 and the time of meeting 200. Additionally, if geolocation rescheduling process 10 performs this determination too late (e.g., a very short time before meeting 200), determination 102 may be less relevant due to user 36 and attendees 208, 210, 212 already having traveled to the location of meeting 200 (e.g. room 202 within building 204).

Once the location of meeting 200 and the location(s) of e.g., user 36 and attendees 208, 210, 212 are determined 100, 102, geolocation rescheduling process 10 may compare 104 the initial meeting location (e.g., conference room 202 in building 204) and one or more of the plurality of attendee locations (e.g., airport 206) to determine if the initial meeting location (e.g., conference room 202 in building 204) could be changed to a location that is more convenient for user 36 and attendees 208, 210, 212. For example, when comparing 104 the location of meeting 200 and the location(s) of e.g., user 36 and attendees 208, 210, 212, geolocation rescheduling process 10 may determine 105 if an alternative meeting location is preferable to the plurality of attendee locations (e.g., airport 206) than the initial meeting location (e.g., conference room 202 in building 204) based upon e.g., geographic proximity and/or transit time.

If the initial meeting location could be changed (i.e., there is another location that is more convenient than e.g., conference room 202 in building 204, geolocation rescheduling process 10 may suggest 106 at least one alternative meeting location. For example, such an alternative meeting location may be proximate one or more of the plurality of attendee locations (e.g., airport 206). The options for alternative meeting locations may be obtained by e.g., locating local restaurants/bars/coffee houses proximate the location of the meeting attendees. If scheduling platform 54 is a corporate scheduling platform, information concerning the location and availability of corporate conference rooms may be available to geolocation rescheduling process 10.

Continuing with the above-stated example, upon comparing 104 the location of meeting 200 and the location(s) of e.g., user 36 and attendees 208, 210, 212, geolocation rescheduling process 10 may determine that the location of meeting 200 could be changed to e.g., a location within airport 206 that may be more convenient to user 36 and attendees 208, 210, 212. Specifically and in this example, user 36 and attendees 208, 210, 212 are each traveling through airport 206 to attend meeting 200 in conference room 202 of building 204, which is located approximately fifty miles from airport 206. Accordingly, each of user 36 and attendees 208, 210, 212 will need to take mass transit, use a car service, or drive to meeting 200. As user 36 and attendees 208, 210, 212 are each already located within airport 206, geolocation rescheduling process 10 may determine that a more convenient location for meeting 200 may be e.g., restaurant 214 within airport 206. Accordingly, geolocation rescheduling process 10 may suggest 106 that meeting 200 be relocated to restaurant 214 within airport 206.

For example and referring also to FIG. 4, geolocation rescheduling process 10 may render suggestion window 250 on the client electronic device (e.g., data-enabled, cellular telephone 28) of one or more of user 36 and attendees 208, 210, 212. Suggestion window 250 may include information screen 252 that may inform the recipient that all of the attendees (e.g., user 36 and attendees 208, 210, 212) of meeting 200 are currently located near e.g., restaurant 214 within airport 206 and, therefore, they might want to consider changing the location of meeting 200 from room 202 to restaurant 214.

As discussed above, the point in time at which geolocation rescheduling process 10 determines the location(s) of user 36 and attendees 208, 210, 212 may greatly impact the ability of geolocation rescheduling process 10 to make prudent decisions concerning the relocation of meeting 200. For example, had geolocation rescheduling process 10 determined 102 the location(s) of user 36 and attendees 208, 210, 212 ten minutes prior to the time/date of meeting 200, it is likely that user 36 and attendees 208, 210, 212 will have already arrived at building 204, thus frustrating the ability of geolocation rescheduling process 10 to suggest a more convenient location for meeting 200. Conversely, had geolocation rescheduling process 10 determined 102 the location(s) of user 36 and attendees 208, 210, 212 five hours prior to the time/date of meeting 200, it is likely that user 36 and attendees 208, 210, 212 would have been scattered across the country in airplanes flying toward airport 206.

When suggesting 106 at least one alternative meeting location, geolocation rescheduling process 10 may determine 108 the availability of the alternative meeting location (e.g., restaurant 214 in airport 206) and may make 110 a reservation at the alternative meeting location (e.g., restaurant 214 in airport 206) for the attendees (e.g., user 36 and attendees 208, 210, 212) if they wish to relocate meeting 200. For example, geolocation rescheduling process 10 may interface with reservation platform 56. Alternatively, reservation platform 56 may be incorporated into/a portion of geolocation rescheduling system 10.

Accordingly and upon the rendering of suggestion window 250 by geolocation rescheduling process 10, if e.g., user 36 agrees to relocate meeting 200, user 36 may select "yes" button 254 (e.g., with a finger tap) within suggestion window 250. In response to selecting "yes" button 254, geolocation rescheduling process 10 may render reservation screen 256 that may inquire as to whether a reservation should be made at restaurant 214. In response to e.g., user 38 selecting "yes" button 258 (e.g., with a finger tap), geolocation rescheduling process 10 may interact with reservation platform 56 to determine 108 the availability at restaurant 214 and make 110 a reservation at restaurant 214.

Depending on the manner in which geolocation rescheduling system 10 is configured, when rendering suggestion window 250, window 250 may only be provided to a select few attendees of meeting 200. For example, suggestion window 250 may only be provided to the organizer of meeting 200, thus avoiding the situation wherein multiple people have differing opinions concerning whether to relocate meeting 200.

When determining 104 whether the initial location of meeting 200 could be changed, geolocation rescheduling process 10 may assign 112 an anticipated transportation mode to each of the plurality of attendees to determine transit time between their current location and the next meeting location. For example, if geolocation rescheduling process 10 knows (through a biography section) that user 36 does not own a car, geolocation rescheduling process 10 may assign 112 an anticipated transportation mode of "mass transit" to user 36. Accordingly, in the event that a potential alternate location for meeting 200 would involve user 36 needing to drive, the viability of this potential alternate location for meeting 200 may be discounted by geolocation rescheduling process 10. Additionally, if it is known that an attendee of meeting 200 is walking at the time that their location is determined 102, geolocation rescheduling process 10 may assign 112 an anticipated transportation mode of "walking" to that attendee. Accordingly, in the event that a potential alternate location for meeting 200 would involve a transportation mode other than "walking", the viability of this potential alternate location for meeting 200 may be discounted by geolocation rescheduling process 10.

As discussed above, reminders may be sent to the attendees of e.g., meeting 200 (e.g., user 36 and attendees 208, 210, 212) to reminder them to attend the same. When providing 114 such reminders concerning meeting 200, geolocation rescheduling process 10 may take into consideration the anticipated transportation mode assigned 112 to each of the plurality of attendees (e.g., user 36 and attendees 208, 210, 212). Accordingly, if it is anticipated that user 36 will be walking to meeting 200, geolocation rescheduling process 10 may provide 114 a reminder to user 36 at a time that allows for sufficient walking time to meeting 200. Alternatively, if it is anticipated that user 36 will be driving to meeting 200, geolocation rescheduling process 10 may provide 114 a reminder to user 36 at a time that allows for sufficient driving time to meeting 200 (possibly taking into consideration current or anticipated traffic conditions). Further, if it is anticipated that user 36 will be flying to meeting 200 (and their flight is known), geolocation rescheduling process 10 may provide 114 a reminder to user 36 at a time that allows for sufficient travel time to the airport (taking into consideration the anticipated transportation mode of user 36).

Additionally, geolocation rescheduling process 10 may take into consideration historical reaction time(s) for each of the attendees when determining how early to send reminders. For example, as handheld client electronic device typically include GPS chipsets, the movement and location of such devices may be determined. Accordingly, geolocation rescheduling process 10 may determine the typical lead time between when a reminder is sent to an attendee and when that attendee actually leaves for the appointment. Accordingly, if an attendee is historically slow to react to reminders, geolocation rescheduling process 10 may provide more lead time to that attendee when sending reminders. Conversely, if an attendee is historically fast to react to reminders, geolocation rescheduling process 10 may provide less lead time to that attendee when sending reminders.

As discussed above, once the location of meeting 200 and the location(s) of e.g., user 36 and attendees 208, 210, 212 are determined 100, 102, geolocation rescheduling process 10 may compare 104 the initial meeting location (e.g., conference room 202 in building 204) and one or more of the plurality of attendee locations (e.g., airport 206) to determine if the initial meeting location (e.g., conference room 202 in building 204) could be changed to a location that is more convenient for user 36 and attendees 208, 210, 212. When performing comparison 104, geolocation rescheduling process 10 may discount 116 one or more attendee locations associated with attendees that are not going to physically attend meeting 200. For example, assume that a fifth attendee (namely attendee 218 lives on Hawaii and has no intention of travelling to the continental United States for one short meeting and plans to attend meeting 200 telephonically. Accordingly, when performing comparison 104 to determine if meeting 200 could be relocated to a more convenient location, the location of attendee 218 may not be considered, as there will be no mutually convenient location for all five attendees and it is not more difficult for attendee 218 to telephonically attend meeting 200 in room 202 of building 204 or at restaurant 214.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in a non-object oriented programming language, such as the "C" programming language, Lisp, ML, Clojure, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
   determining an initial meeting location for a meeting previously-scheduled to be attended by a plurality of attendees at a defined meeting time;
   determining a current attendee location and an anticipated transportation mode for each of the plurality of attendees proximate the defined meeting time;
   determining at least one alternative meeting location during a time window prior to the defined meeting time by comparing the initial meeting location and the current attendee location including the anticipated transportation mode of each of the plurality of attendees, the at least one alternative meeting location allowing sufficient time for each of the plurality of attendees to arrive at the at least one alternative meeting location prior to the defined meeting time;
   suggesting the at least one alternative meeting location to the plurality of attendees proximate to the defined meeting time;
   determining historical reaction times for each of the plurality of attendees associated with one or more meeting reminders; and
   providing a meeting reminder to each of the plurality of attendees proximate the defined meeting time based, at least in part, upon the anticipated transportation mode and the historical reaction times of each of the plurality of attendees.

2. The computer-implemented method of claim 1 wherein the at least one alternative meeting location is proximate one or more of the plurality of attendee locations.

3. The computer-implemented method of claim 1 wherein at least one of the plurality of attendees is an organizer of the meeting.

4. The computer-implemented method of claim 1 wherein suggesting at least one alternative meeting location includes:
   determining the availability of the at least one alternative meeting location.

5. The computer-implemented method of claim 1 further comprising:
   making a reservation at the at least one alternative meeting location.

6. The computer-implemented method of claim 1 wherein comparing the initial meeting location and one or more of the plurality of attendee locations includes:
   discounting one or more attendee locations associated with attendees that are not going to physically attend the meeting.

7. The computer-implemented method of claim 1 wherein comparing the initial meeting location and one or more of the plurality of attendee locations includes:
   determining if the at least one alternative meeting location is preferable to the one or more of the plurality of attendee locations than the initial meeting location based upon at least one of geographic proximity and transit time.

8. A computer program product comprising a non-transitory computer readable medium having a plurality of instructions stored thereon which, when executed by a processor, cause the processor to perform operations comprising:
   determining an initial meeting location for a meeting previously-scheduled to be attended by a plurality of attendees at a defined meeting time;
   determining a current attendee location and an anticipated transportation mode for each of the plurality of attendees proximate the defined meeting time;
   determining at least one alternative meeting location during a time window prior to the defined meeting time by comparing the initial meeting location and the current attendee location including the anticipated transportation mode of each of the plurality of attendees, the at least one alternative meeting location allowing sufficient time for each of the plurality of attendees to arrive at the at least one alternative meeting location prior to the defined meeting time;
   suggesting the at least one alternative meeting location to the plurality of attendees proximate to the defined meeting time;
   determining historical reaction times for each of the plurality of attendees associated with one or more meeting reminders; and
   providing a meeting reminder to each of the plurality of attendees proximate the defined meeting time based, at least in part, upon the anticipated transportation mode and the historical reaction times of each of the plurality of attendees.

9. The computer program product of claim 8 wherein the at least one alternative meeting location is proximate one or more of the plurality of attendee locations.

10. The computer program product of claim 8 wherein at least one of the plurality of attendees is an organizer of the meeting.

11. The computer program product of claim 8 wherein suggesting at least one alternative meeting location includes:
    determining the availability of the at least one alternative meeting location.

12. The computer program product of claim 8 further comprising:
   making a reservation at the at least one alternative meeting location.

13. The computer program product of claim 8 wherein comparing the initial meeting location and one or more of the plurality of attendee locations includes:
   discounting one or more attendee locations associated with attendees that are not going to physically attend the meeting.

14. The computer program product of claim 8 wherein comparing the initial meeting location and one or more of the plurality of attendee locations includes:
   determining if the at least one alternative meeting location is preferable to the one or more of the plurality of attendee locations than the initial meeting location based upon at least one of geographic proximity and transit time.

15. A computing system including a processor and memory configured to perform operations comprising:
   determining an initial meeting location for a meeting previously-scheduled to be attended by a plurality of attendees at a defined meeting time;
   determining a current attendee location and an anticipated transportation mode for each of the plurality of attendees proximate the defined meeting time;
   determining at least one alternative meeting location during a time window prior to the defined meeting time by comparing the initial meeting location and the current attendee location including the anticipated transportation mode of each of the plurality of attendees, the at least one alternative meeting location allowing sufficient time for each of the plurality of attendees to arrive at the at least one alternative meeting location prior to the defined meeting time;
   suggesting the at least one alternative meeting location to the plurality of attendees proximate to the defined meeting time;
   determining historical reaction times for each of the plurality of attendees associated with one or more meeting reminders; and
   providing a meeting reminder to each of the plurality of attendees proximate the defined meeting time based, at least in part, upon the anticipated transportation mode and the historical reaction times of each of the plurality of attendees.

16. The computing system of claim 15 wherein the at least one alternative meeting location is proximate one or more of the plurality of attendee locations.

17. The computing system of claim 15 wherein at least one of the plurality of attendees is an organizer of the meeting.

18. The computing system of claim 15 wherein suggesting at least one alternative meeting location includes:
   determining the availability of the at least one alternative meeting location.

19. The computing system of claim 15 further comprising:
   making a reservation at the at least one alternative meeting location.

20. The computing system of claim 15 wherein comparing the initial meeting location and one or more of the plurality of attendee locations includes:
   discounting one or more attendee locations associated with attendees that are not going to physically attend the meeting.

21. The computing system of claim 15 wherein comparing the initial meeting location and one or more of the plurality of attendee locations includes:
   determining if the at least one alternative meeting location is preferable to the one or more of the plurality of attendee locations than the initial meeting location based upon at least one of geographic proximity and transit time.

* * * * *